United States Patent
Kim et al.

(10) Patent No.: US 7,148,312 B2
(45) Date of Patent: Dec. 12, 2006

(54) PREPARATION METHOD OF HIGH MOLECULAR WEIGHT POLYCARBONATE RESIN

(75) Inventors: Jong-Hun Kim, Daejeon (KR); Boo-Gon Woo, Daejon (KR); Eun-Duck Park, Incheon (KR); Mi-Jeung Hong, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/500,901

(22) PCT Filed: Oct. 8, 2003

(86) PCT No.: PCT/KR03/02070

§ 371 (c)(1),
(2), (4) Date: Jul. 27, 2005

(87) PCT Pub. No.: WO2004/041906

PCT Pub. Date: May 21, 2004

(65) Prior Publication Data

US 2006/0167211 A1    Jul. 27, 2006

(30) Foreign Application Priority Data

Nov. 7, 2002    (KR) ............ 10-2002-0068853
Nov. 7, 2002    (KR) ............ 10-2002-0068854

(51) Int. Cl.
*C08G 64/00* (2006.01)

(52) U.S. Cl. ............ 528/196; 422/131; 528/198; 528/480

(58) Field of Classification Search ......... 422/131; 528/196, 198, 480
See application file for complete search history.

(56) References Cited

U.S. PATENT DOCUMENTS

| 4,948,871 A | 8/1990 | Fukuoka et al. ............ 528/481 |
| 5,214,073 A | 5/1993 | Fukawa et al. ............ 521/60 |
| 5,717,056 A | 2/1998 | Varadarajan et al. ........ 528/196 |
| 5,905,135 A | 5/1999 | Idage et al. ............ 528/196 |
| 6,031,063 A | 2/2000 | Day et al. ............ 528/196 |
| 6,222,001 B1 | 4/2001 | Day et al. ............ 528/196 |

FOREIGN PATENT DOCUMENTS

| JP | 2000-80171 | | 3/2000 |
| JP | 200080171 | * | 3/2000 |

OTHER PUBLICATIONS

PCT International Search Report; International application No. PCT/KR03/02070; International filing date: Oct. 8, 2003; Date of Mailing: Feb. 11, 2004.

* cited by examiner

Primary Examiner—Terressa Boykin

(57) ABSTRACT

The present invention relates to a method for the preparation of a high molecular weight polycarbonate resin, and more particularly to a method for preparing a high molecular weight polycarbonate resin using a solid state polymerization method after the preparation of a crystalline polycarbonate or-conducting the preparation of the crystalline polycarbonate and the solid state polymerization thereof simultaneously. According to the method for the preparation of a high molecular weight polycarbonate resin of the invention, it is possible to produce a high molecular weight polycarbonate resin having a narrow molecular weight distribution and uniform properties and that is applicable to injection and extrusion in large quantities with a low cost within a short time.

21 Claims, 3 Drawing Sheets

PREPARATION METHOD OF HIGH MOLECULAR WEIGHT POLYCARBONATE RESIN

BACKGROUND OF THE INVENTION (a) Field of the Invention

The present invention relates to a method for preparing a high molecular weight polycarbonate resin, and more particularly to a method for preparing a high molecular weight polycarbonate resin, which can produce a high molecular weight polycarbonate resin that has narrow molecular weight distribution and this has uniform physical properties, and that can be used for injection and extrusion, in large quantities with a low cost within a short time.

(b) Description of the Related Art

As polycarbonate resins have excellent heat resistance, impact resistance, mechanical strength, transparency, etc., they are widely used in the preparation of compact disks, transparent sheets, package wrapping, car bumpers, films for UV blockers, and so on, and demands therefore are rapidly increasing.

The previous processes for the production of polycarbonate resins can be divided into interfacial polymerization using a phosgene, and melt polymerization and solid state polymerization that do not use a phosgene.

Interfacial polymerization is a process carried out by mixing an aqueous solution of aromatic hydroxy compounds such as bisphenol A and a gaseous state phosgene in an organic solvent to allow a polymerization reaction to occur in the interface between the aqueous solution layer and the organic solvent layer.

This process enables the production of high molecular weight polycarbonates in a comparatively easy manner by a continuous process, but as it uses toxic gases and chlorine-type organic solvents that are noxious substances, it has a very high risk and therefore it requires excessive facility costs.

Melt polymerization, a process wherein the polymerization proceeds using starting monomers in their melt state, has the advantage of having a low risk because it does not use toxic materials, but in order to produce high molecular weight polycarbonates for injection and extrusion, a high temperature, high vacuum facility is needed when high viscous reactants are treated, and thus the quality is deteriorated. Solid state polymerization is a process wherein the polymerization proceeds at a temperature lower than the melting temperature after the crystallization of low molecular weight polycarbonate prepolymers, it does not use toxic materials, and it can prevent the deterioration of quality because the reaction occurs in a solid state.

In the solid state polymerization disclosed in U.S. Pat. No. 4,948,871 and U.S. Pat. No. 5,214,073, a crystalline polycarbonate, which can be polymerized in a solid state manner, was prepared by heat treatment of a non-crystalline polycarbonate prepolymer at its crystallization temperature over a long time (crystallization system by heat treatment) or by dissolving it in a solvent and precipitating it with a non-solvent (non-solvent precipitation method).

In the crystallization system by heat treatment, a long time (72 hours or longer) is required and the degree of crystallization is comparatively low, and thus it is difficult to prepare a crystalline polycarbonate suitable for solid state polymerization.

In the crystallization system by non-solvent precipitation, as two kinds of solvents are used, these solvents should be completely separated after crystallization, and the crystallization state between early and end processes may be different due to the ratio difference between the solvent and non-solvent during the precipitation.

The solid state polymerization disclosed in U.S. Pat. No. 6,031,063 and U.S. Pat. No. 6,222,001 employed a crystallization system that was conducted by contacting a non-crystalline polycarbonate in a pellet state with a difficult solvent in a gas or liquid state at its crystallization temperature for a certain time. This system enables the preparation of a crystalline polycarbonate suitable for solid state polymerization within a comparatively short time, but it has a problem of requiring pelletization or pulverization before crystallization.

Therefore, in order to prepare crystalline polycarbonates necessary for solid state polymerization in an economical way, studies about excluding or simplifying the pulverization and drying steps in the previous crystallization processes are needed, and in addition, so as to minimize the time required for solid state polymerization, it is essential to develop a crystallization process capable of preparing crystalline polycarbonates that are the most suitable for solid state polymerization by controlling the size and distribution of crystalline polycarbonates.

The solid state polymerizations disclosed in U.S. Pat. No. 4,948,871, U.S. Pat. No. 5,214,073, U.S. Pat. No. 5,717,056, and U.S. Pat. No. 5,905,135 comprise the following three stages:

Stage 1: Preparation of a low molecular weight polycarbonate prepolymer by an ester-exchange reaction of a dialkyl(aryl)carbonate and an aromatic hydroxy compound;

Stage 2: Preparation of a crystalline polycarbonate by the crystallization of the low molecular weight polycarbonate prepolymer of stage 1; and Stage 3: Preparation of a high molecular weight polycarbonate by the solid state polymerization of the crystalline polycarbonate of stage 2.

However, these methods are also problematic because the maximum molecular weight reaches at most 38,800 g/mol after more than 8 hours of solid state polymerization due to the large molar ratio difference between the arylcarbonate groups and aromatic hydroxy groups due to the reaction byproducts and unreacted diarylcarbonates that co-exist together with the low molecular weight non-crystalline prepolymer.

In addition, as such molar ratio difference is supposed to be increased in proportion to the increase in the molecular weight of the prepolymer to enhance the properties of the polycarbonate, it has an adverse effect on the increase of the molecular weight in the solid state polymerization for the same reason as above even though it may be advantageous to properties. Further, in order to carry out the solid state polymerization, non-crystalline polycarbonates should be converted into crystalline polycarbonates, and for this, in the above preparation methods, a separate crystallization process is used before the solid state polymerization. As examples of the crystallization process in the above processes, there can be included a method of treating a non-crystalline polycarbonate prepolymer with heat at its crystallization temperature for a long time, and a method for preparing a crystalline polycarbonate that can be polymerized in the solid state by precipitating a non-crystalline polycarbonate with a non-solvent after dissolving it in a solvent.

In the crystallization system by heat treatment, a long time (72 hours or longer) is required and the degree of crystallization is comparatively low, and thus it is difficult to prepare a crystalline polycarbonate suitable for solid state polymerization.

In the crystallization system by non-solvent precipitation, as two kinds of solvents are used, these solvents should be completely separated after crystallization, and the crystallization state between early and end processes may be different due to the ratio difference between the solvent and non-solvent during the precipitation.

Therefore, in order to prepare high molecular weight polycarbonates through solid state polymerization, it is necessary to substantially reduce the reaction time by maximizing the increase rate in molecular weight during the solid state polymerization, and to simplify the overall manufacturing process by improving the main process stage that is divided into crystallization and solid state polymerization, as well as additional process steps such as a separate pulverization step, a drying step, etc. It is essential that the properties of the high molecular weight polycarbonates to be produced through the solid state polymerization are uniform by efficiently controlling the distribution, size, and crystallinity of the polycarbonates used in the solid state polymerization.

SUMMARY OF THE INVENTION

This invention has been made to solve the aforementioned problems, and it is an object of the invention to provide a method for the crystallization of a polycarbonate, which can produce high molecular weight polycarbonate resin that can be polymerized in a solid state without separate pulverization, and thus has narrow molecular weight distribution, therefore has uniform physical properties, and that can be used for injection and extrusion, in a large quantity with a low cost within a short time.

Further, it is an object of the invention to provide a crystalline polycarbonate prepared according to the above method.

Still further, it is an object of the invention to provide a method for the preparation of a high molecular weight polycarbonate resin by solid state polymerization of the crystalline polycarbonate prepared by the above method.

Further, it is an object of the invention to provide a high molecular weight polycarbonate prepared according to the above method.

Further, it is an object of the invention to provide a method for the preparation of a high molecular weight polycarbonate resin capable of efficiently preparing a quantity of the high molecular weight polycarbonate resin within a short time by conducting both crystallization and solid state polymerization of a non-crystalline polycarbonate, which is prepared through melt polycondensation, in a solid state polymerization reactor at the same time without a separate crystallization process, as well as being capable of maximizing the increase rate of the molecular weight of the polycarbonate resin during the solid state polymerization by optimizing the molar ratio between the reactive terminal groups of the non-crystalline polycarbonate resin by the elimination of unreacted reactants and low molecular weight byproducts during the melt polycondensation stage where ester-exchange reaction and short-time condensation polymerization occur continuously.

Still further, it is an object of the invention to provide a high molecular weight polycarbonate prepared according to the above method in order to achieve these objects, the present invention provides a crystallization method of a non-crystalline polycarbonate characterized by using a spray crystallization method comprising (a) dissolving a non-crystalline polycarbonate having a weight average molecular weight of 1,500 to 30,000 g/mol in a solvent; (b) transferring the polycarbonate solution into a drying chamber and then spraying it using a nozzle in the drying chamber; and (c) contacting the sprayed solution with a high temperature gas to evaporate the solvent thereby obtaining a crystalline polycarbonate.

Also, the invention provides a crystalline polycarbonate prepared according to the above method.

Further, the invention provides a method for the preparation of a high molecular weight polycarbonate resin comprising (a) preparing a crystalline polycarbonate by the above method; and (b) conducting a solid state polymerization of the crystalline polycarbonate prepared in a) to prepare a high molecular weight polycarbonate resin having a weight average molecular weight of 35,000 to 200,000 g/mol.

Also, the invention provides a high molecular weight polycarbonate resin prepared according to the above method.

Further, the invention provides a method for the preparation of a high molecular weight polycarbonate resin, characterized in that it comprises (a) conducting a melt polycondensation of a dialkyl(aryl)carbonate and an aromatic hydroxyl compound in the presence of a catalyst to prepare a non-crystalline polycarbonate having a weight average molecular weight of 1,500 to 30,000 g/mol; (b) dissolving the non-crystalline polycarbonate in a solvent to prepare a non-crystalline polycarbonate solution; and (c) transferring the non-crystalline polycarbonate solution into a solid state polymerization reactor and then conducting an intensive solid state polymerization, wherein crystallization and solid state polymerization are conducted simultaneously, to prepare a high molecular weight polycarbonate resin having a weight average molecular weight of 35,000 to 200,000 g/mol,.

Also, the invention provides a high molecular weight polycarbonate resin prepared according to the above method.

DESCRIPTION OF MAIN REFERENCE NUMERALS USED IN THE DRAWINGS

Figure 1:
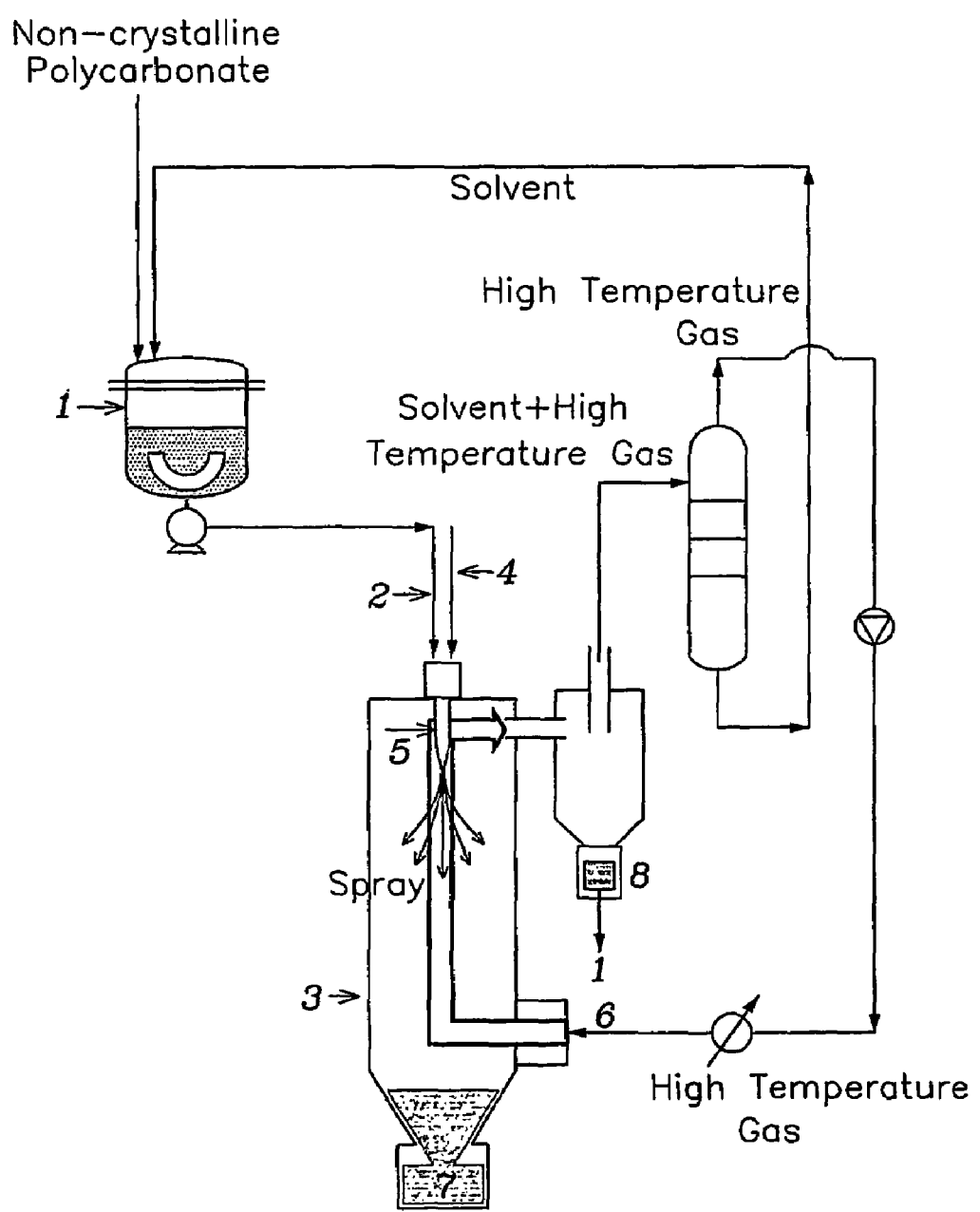
FIG. 1 shows a reactor for the crystallization of polycarbonates.

1. Dissolution bath
2. Transfer Pipe for Polycarbonate Solution
3. Drying Chamber
4. Injection Pipe for Compressed Gas (When pneumatic nozzle is used)
5. Spray Nozzle
6. Injection Pipe for High Temperature Gas
7. Agglomeration chamber for Crystalline Polycarbonate
8. Agglomeration Cyclon for Non-crystalline Polycarbonate
101. Dissolution bath
102. Polycarbonate Solution
103. Compressed Gas (When pneumatic nozzle is used)

104. Spray Nozzle
105. Intensive Solid State Polymerization Reactor
106. Polycarbonate Fine Particle
107. Flow Direction of Sprayed Solution and Particle
108. Flow Direction of High Temperature Nitrogen
109. Byproduct
110. Refluxed Nitrogen
111. Refluxed Solvent
112. High Molecular Weight Polycarbonate

DETAILED DESCRIPTION OF THE
PREFERRED EMBODIMENTS

This invention will be further described in more detail.

The inventors have discovered, in the course of studying enhancement of the efficiency of the solid state polymerization process and increasing the economic performance of the crystallization process through the simplification of the crystallization of non-crystalline polycarbonates for solid state polymerization, that a crystalline polycarbonate suitable for solid state polymerization can be easily prepared by crystallizing a non-crystalline polycarbonate having a weight average molecular weight of 1,500 to 30,000 g/mol using a spray crystallization method, and that through the optimization of the method, a high molecular weight polycarbonate resin having a weight average molecular weight of 35,000 to 200,000 g/mol can be prepared by solid state polymerization within a short time. The present invention is based on the above discovery.

The crystallization of a non-crystalline polycarbonate of the invention is characterized by comprising a series of reactions, as follows.

First, a non-crystalline polycarbonate having a weight average molecular weight of 1,500 to 30,000 g/mol is dissolved in a solvent (step (a)). The non-crystalline polycarbonate is preferably selected from those prepared by interfacial polymerization, by ester-exchange reaction of a dialkyl(aryl)carbonate and an aromatic dihydroxy compound, or by an ester-exchange reaction and a condensation reaction.

In addition, the non-crystalline polycarbonate is preferably a linear polycarbonate, a branched polycarbonate wherein multi-functional monomers are contained in an amount of 0.1 to 5.0 wt % of the total monomers (branched polycarbonate form or cross-linked polycarbonate), or a mixture thereof.

The solvent used for the preparation of the non-crystalline polycarbonate solution is preferably methylene chloride, chloroform, tetrahydrofuran, methacresol, cyclohexane, dioxane, dimethylformaldehyde, pyridine, or a mixture thereof.

In addition, the concentration of the polycarbonate solution is preferably 5.0 to 50.0 wt %, and more preferably 10.0 to 30.0 wt %. If the concentration of the polycarbonate solution is less than 5.0 wt %, the prepared polycarbonate cannot be used to prepare a high molecular weight polycarbonate resin, and if it exceeds 50.0 wt %, the viscosity of the polycarbonate solution is high and thus the spray ejection does not proceed smoothly.

Next, the polycarbonate solution prepared in step (a) is transferred to a drying chamber and sprayed within the drying chamber through a nozzle (step (b)). Both a spraying method using a pressure nozzle and a method of injecting high pressure gas in a separate way using a pneumatic nozzle can preferably be used.

The nozzle used in step (b) is preferably a pressure nozzle or a pneumatic nozzle.

In the case where the pressure nozzle is used, the spray pressure is preferably 2.0 to 51.0 kgf/cm$^2$. If the spray pressure is less than 2.0 kgf/cm$^2$, the nozzle inlet is readily blocked when the polycarbonate solution is sprayed, and if the spray pressure exceeds 51.0 kgf/cm$^2$, the polycarbonate solution is sprayed is in an amount greater than the amount that can be evaporated in the next step (step (c)), so the content of the remaining solvent that does not evaporate is excessive, and thus it is not preferable.

In the case where the pneumatic nozzle is used, the injection speed of the compressed gas is preferably 200 to 800 l/hour, and more particularly 300 to 800 l/hour. If the injection speed of the compressed gas is less than 200 l/hour, the content of the solvent that does not evaporate is increased within the produced crystalline polycarbonate particles, and if the injection speed of the compressed gas exceeds 800 l/hour, most crystalline particles that are produced become fine powders having a diameter of less than 80 μm and the degree of crystallization becomes lower than 5%.

Next, the sprayed solution is contacted with a high temperature gas to evaporate the solvent, thereby obtaining a crystalline polycarbonate (step (c)).

The high temperature gas is preferably flowed in a direction opposite to the spray ejection. If the flow direction of the high temperature gas is the same as the spray direction of the polycarbonate and the flow direction of the particles, the evaporation speed of the solvent is high and thus the degree of crystallization of the produced polycarbonate particles is substantially decreased.

The preparation of crystalline polycarbonate using the spray crystallization method enables simultaneous conducting of a crystallization and drying of a polycarbonate, and accordingly it has advantages in that the reaction process is simple and costs for production can be saved.

The gas used in the evaporation of the polycarbonate solution is preferably nitrogen, air, carbon dioxide, or a mixed gas thereof. The temperature of the gas is preferably 40 to 250° C., at which the solvent within the polycarbonate solution can be sufficiently evaporated, and more preferably 60 to 150° C.

If the temperature of the high temperature gas is less than 40° C., the evaporation speed of the solvent is slow and the solvent is not sufficiently evaporated, and accordingly it cannot be immediately applied to the solid state polymerization without an additional drying process, and if it exceeds 250° C., the evaporation speed of the solvent is too fast and thus the degree of crystallization becomes low, and accordingly it is difficult to immediately apply it to the solid state polymerization, which is the preparation method of the high molecular weight polycarbonate resin of the invention.

The average diameter of the crystalline polycarbonate particles remaining after the evaporation of the solvent is preferably 80 to 3,000 μm, and the variation of the polycarbonate particles is preferably within 20%.

If the diameter of the crystalline polycarbonate particles prepared by the spray crystallization method is less than 80 μm or more than 3,000 μm, the degree of crystallization of the polycarbonate becomes too low or high and is not suitable for the nitrogen input or reduced pressure conditions during the solid state polymerization.

Also, if the variation of the particle diameter of the crystalline polycarbonate remaining after the evaporation of the solvent exceeds 20%, the physical properties of the crystalline polycarbonate deteriorate.

The polycarbonate particles prepared according to the above-explained method of the present invention have a uniform particle size and uniform particle size distribution with a small variation, and thus they are suitable for the subsequent solid state polymerization, and accordingly, they enable the preparation of a high molecular weight polycarbonate resin with a low cost without requiring pulverization.

The preparation of the crystalline polycarbonate of the present invention will be described in more detail with reference to FIG. 1.

A non-crystalline polycarbonate is stirred in a dissolution bath (1) filled with a solvent and dissolved.

Next, the polycarbonate solution is transferred into a drying chamber (3) via a transfer pipe (2), and at the same time, a compressed gas such as nitrogen is injected into the drying chamber (3) via an injection pipe for compressed gas (4), and then the polycarbonate solution is sprayed via a spray nozzle (5). The optimal injection speed of the compressed gas into the nozzle varies by the concentration of the solution. If the pressure nozzle is used instead of the pneumatic nozzle, instead of using the compressed gas, the injection pressure of the polycarbonate is raised to over 2.0 kgf/cm$^2$ and then it is sprayed.

High temperature gas is injected into the drying chamber (3) via the injection pipe for high temperature gas (6) in a direction opposite to the spray of the polycarbonate solution to evaporate the solvent in the polycarbonate solution. The evaporated solvent and high temperature gas are separated into a liquid state solvent and gas, and then the solvent is refluxed into a dissolution bath (1) and the gas is heated again and then input into the drying chamber (3).

The crystalline polycarbonate is agglomerated into an agglomeration chamber for crystalline polycarbonate (7) and the non-crystalline polycarbonate that is not crystallized is agglomerated into an agglomeration cyclon for non-crystalline polycarbonate (8).

Also, the present invention provides a method for the preparation of a high molecular weight polycarbonate resin having a weight average molecular weight of 35,000 to 200,000 g/mol by the solid state polymerization of a crystalline polycarbonate prepared by the above method.

The high molecular weight polycarbonate resin of the present invention prepared by the above method preferably has molecular weight of 35,000 to 200,000 g/mol. If the molecular weight of the high molecular weight polycarbonate resin is less than 35,000 g/mol or more than 200,000 g/mol, it cannot be preferably used for injection and extrusion.

There are two types of solid state polymerization methods. One is to inject crystalline polycarbonate into a solid state polymerization reactor and continuously inject nitrogen thereinto, and the other is to prepare a high molecular weight polycarbonate resin having a weight average molecular weight of 35,000 to 200,000 g/mol by solid state polymerization while eliminating the reaction byproducts under the reduced pressure of 0 to 50 mmHg, and more preferably 0 to 20 mmHg.

The crystalline polycarbonate is used without a separate pulverization and drying step. The solid state polymerization proceeds at an isothermal or elevated temperature so that the solid state polymerization temperature ($T_p$) can satisfy the following formula 1 ($T_m$=melting temperature).

$T_m - 50 \leq T_p \leq T_m$ [Formula 1]

The polycarbonate resin of the present invention prepared through the above steps has a weight average molecular weight of 35,000 to 200,000 g/mol, and can be preferably used for injection and extrusion.

In addition, in the case of a solid state polymerization of the crystalline polycarbonate prepared by the previous crystallization manner, the poly dispersity index was increased by 15% to 25% in comparison with the value before the solid state polymerization. On the other hand, in the case of solid state polymerization using the crystalline polycarbonate prepared by the present invention, the particle size and the degree of crystallization were uniform and the increase in poly dispersity index after the solid state polymerization was within 5.5%, and was thus remarkably decreased as compared with the previous crystallization manner, and therefore a high molecular weight polycarbonate resin having a uniform molecular weight and physical properties could be prepared.

As described above, the crystallization method of non-crystalline polycarbonates of the present invention enables solid state polymerization without a separate pulverization step, and accordingly, a high molecular weight polycarbonate resin having a narrow molecular weight distribution and uniform physical properties that is applicable to injection and extrusion can be produced in large quantities with a low cost within a short time.

The following is another embodiment of the invention, a method for preparing a high molecular weight polycarbonate by proceeding crystallization and solid state polymerization at the same time.

The present inventors have identified, in the course of studying a method capable of highly increasing the molecular weight of polycarbonates within a short time and of remarkably shortening the manufacturing process, that as a result of the elimination of unreacted dialkyl(aryl)carbonate and byproducts of a low degree of polymerization of less than 3 through melt polycondensation wherein an ester-exchange reaction of a dialkyl(aryl)carbonate and an aromatic hydroxy compound and short-time condensation polymerization occur continuously, the molar ratio of aryl carbonate within the total terminal group was lowered to about 50.0 to 50.2%, and in the subsequent solid state polymerization step, a high molecular weight polycarbonate resin having a weight average molecular weight of 35,000 to 200,000 g/mol could be produced within a short time.

In addition, according to the preparation method of the present invention, the crystallization and solid state polymerization proceed at the same time in a solid state reactor without a separate crystallization process, and thus the manufacturing process is remarkably reduced. In addition, the inventors have discovered that the physical properties of the high molecular weight polycarbonate final product, such as crystallinity and molecular weight, became very uniform by introducing a spray crystallization method via a nozzle into the upper portion of the solid state polymerization reactor. The present invention is based on the above discovery.

The method for the preparation of a high molecular weight polycarbonate resin of the present invention is characterized by comprising a series of reactions, as follows.

First, a non-crystalline polycarbonate having a weight average molecular weight of 1,500 to 30,000 g/mol is prepared by melt polycondensation of a dialkyl(aryl)carbonate and an aromatic hydroxy compound in the presence of a catalyst (step (a)).

The melt polycondensation reaction of step (a) is characterized in that the ester-exchange reaction and the condensation reaction occur continuously.

Firstly, the dialkyl(aryl)carbonate and aromatic hydroxy compound are mixed in a molar ratio of 1:1 to 1.1:1, and then melted in a melting chamber that is maintained at 150 to 200° C. under a nitrogen atmosphere, with elevating temperature.

In the melt polycondensation reaction of step (a), a mixing ratio of dialkyl(aryl)carbonate and aromatic hydroxy compound is preferably 1:1 to 1.1:1. If the molar ratio of the dialkyl(aryl)carbonate and aromatic hydroxy compound is out of the range of the molar ratio of 1:1 to 1.1:1, the molecular weight of the produced polycarbonate becomes low or the reaction may be terminated early.

After the melting, the materials are fed into a stirring reactor whose jacket temperature is maintained at 180 to 250° C. In order to prevent the high temperature reactants from contacting with oxygen, the air within the reactor is substituted by nitrogen.

After the injection of the reaction materials, the reaction is initiated by injecting a catalyst for an ester-exchange reaction. After the reaction somewhat proceeds at atmospheric pressure or an increased pressure under a nitrogen atmosphere, byproducts such as phenol produced during the reaction are eliminated by evaporation under a reduced pressure of 1 to 100 mmHg.

Since the dialkyl(aryl)carbonate, which is the reaction material, may be evaporated along with the reaction byproducts that are evaporated, it is condensed in a reflux column adhered to the reactor and then refluxed to the reactor, and only the reaction byproducts that are not liquidized in the reflux column are condensed in a condenser and eliminated by discharging them to the outside of the reactor.

The products of the above reaction are transferred into the next reactor, a condensation reactor, where unreacted dialkyl (aryl)carbonate and the reaction byproducts of a low degree of polymerization of less than 3 and new reaction byproducts such as phenol that are newly generated during the reaction are eliminated by the high temperature, reduced pressure condition or are eliminated within a short time by the injection of nitrogen under the room pressure condition, to thereby prepare a non-crystalline polycarbonate having a somewhat increased molecular weight in comparison with the initial products.

The reaction temperature is preferably 180 to 400° C., and more preferably 200 to 350° C. The dialkyl(aryl)carbonate that exists in an unreacted state, the reaction byproducts having the degree of polymerization of less than 3, and phenol, which is a newly generated byproduct, can be eliminated at such a high temperature as above and at a reduced pressure of 0 to 50 mmHg and more preferably at a reduced pressure of 0 to 20 mmHg, or they can be eliminated by the injection of nitrogen instead of using the reduced pressure.

The amount of nitrogen to be injected is preferably 0.1 Nm$^3$/kg·h or more. If the amount of nitrogen to be injected is less than 0.1 Nm$^3$/kg·h, the elimination of the reaction byproducts is not easy.

In the above procedure, in addition to the newly generated phenol byproduct, the byproducts having the degree of polymerization of less than 3 and the unreacted dialkyl(aryl) carbonate that does not participate in the reaction because of its relatively low boiling temperature are discharged to the outside of the reactor by being evaporated together with the phenol. Such phenomenon has an effect on the acceleration of the increase of the molecular weight of polycarbonates in the solid state polymerization as compared with the previous processes (U.S. Pat. No. 4,948,871 and U.S. Pat. No. 5,214,073).

In the conventional processes, the diarylcarbonate that is used in an excessive amount in the initial reaction step and the byproducts having the degree of polymerization of less than 3 are not eliminated before the solid state polymerization, unlike the invention, and the difference in the molar ratio of an aromatic hydroxy group and arylcarbonate at the terminal of the generated prepolymer is increased according to the increase in the molecular weight of the prepolymer, and accordingly, it takes a long time to prepare a high molecular weight polycarbonate in the following solid state polymerization.

That is, as the molecular weight of the prepolymer is increased, the arylcarbonate of the terminal group exists in an increasingly excessive amount, as shown in the following formula 2, and accordingly this has an adverse effect on the increase of molecular weight.

When $2{,}000 \leq M_w \leq 5{,}000$, $50 < X \leq 100$, [Formula 2]

When $5{,}000 \leq M_w \leq 20{,}000$, $0.002 M_w + 40 \leq X \leq 100$ (wherein $M_w$ is the molecular weight of a prepolymer, and X is the molar ratio of arylcarbonate contained in the total terminal group.)

The melt polycondensation reaction of step (a) is preferably conducted within a reactor wherein an ordinary stirring reactor having a reflux column and a condenser, and an ordinary condensation reactor such as a rotating disk reactor, a rotating cage reactor, or a thin film reactor, are continuously linked.

As the dialkyl(aryl)carbonate, diphenyl-carbonate, bis-chlorophenyl-carbonate, m-cresyl-carbonate, dinaphthyl-carbonate, dimethyl-carbonate, dicyclohexyl-carbonate, or a mixture thereof can be preferably used.

Also, as the aromatic hydroxy compound, bis(4-hydroxyphenyl)-methane, 2,2-bis(4-hydroxyphenyl)-propane, 2,2-bis(4-hydroxy-3,5-dibromophenyl)-propane, 1,4-dihydroxy-3-methyl-benzene, bis(4-hydroxyphenyl)sulfide, or a mixture thereof can be preferably used.

Also, as the catalyst, an alkalimetal catalyst, a nitrogen-based catalyst, an acid catalyst, etc. are preferable. More particularly, as the alkalimetal catalyst, sodium hydroxide, potassium hydroxide, lithium hydroxide, sodium carbonate, potassium carbonate, lithium carbonate, etc. are preferable; as the nitrogen-based catalyst, tetramethylammoniumhydroxide (($CH_3$)$_4$NOH), tetrabutylammoniumhydroxide (($C_4H_9$)$_4$NOH), etc. are preferable; and as the acid catalyst, boric acid, phosphoric acid, etc. are preferable.

Next, the non-crystalline polycarbonate is dissolved in a solvent to prepare a non-crystalline polycarbonate solution (step (b)).

Figure 3:
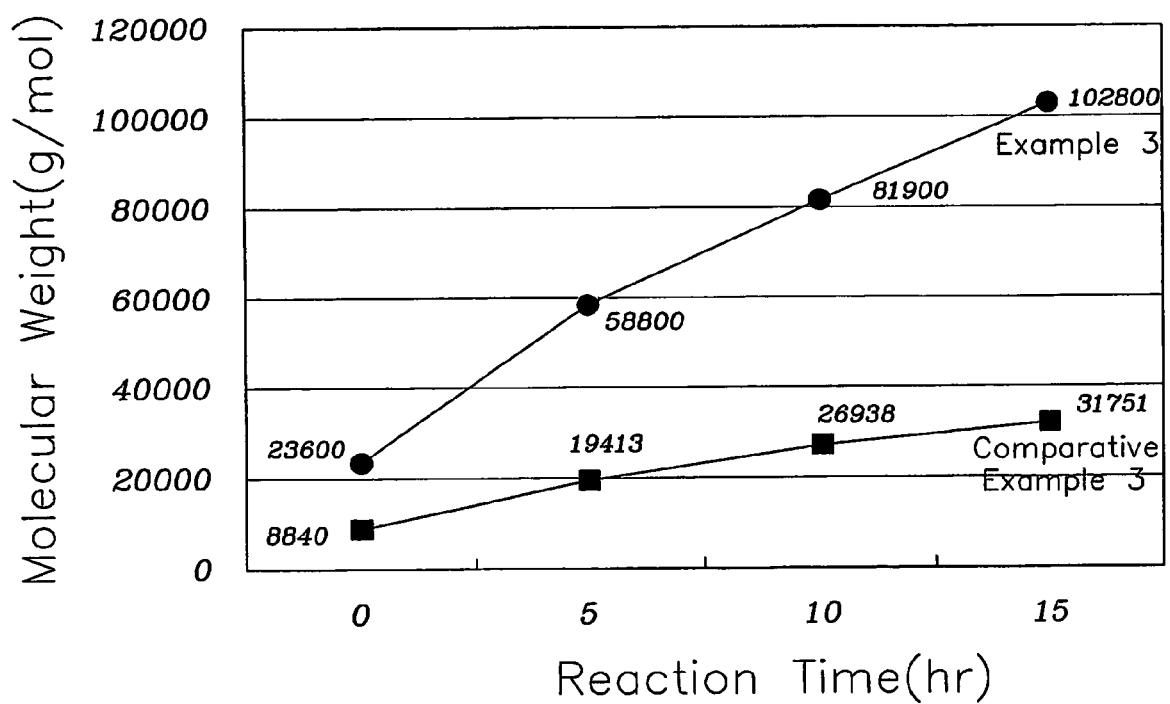
FIG. 3 is a graph showing an increase in the molecular weight of the polycarbonates prepared according to the methods of Example 3 and Comparative Example 3.

As shown in FIG. 3, the melt or solid state non-crystalline polycarbonate having a weight average molecular weight of 1,500 to 30,000 g/mol prepared in step (a) above is dissolved in a dissolution bath filled with the solvent, while stirring.

As the solvent, methylenechloride, chloroform, tetrahydrofuran, methacresol, cyclohexane, dioxane, dimethylformaldehyde, pyridine, etc. can be used, and the temperature of the solvent bath is room temperature, and accordingly it is not heated or cooled for control of temperature. The solvent evaporated in the solvent bath is condensed in a reflux column adhered thereto and refluxed into the dissolution bath. The concentration of the dissolved polycarbonate solution is preferably 5.0 to 50.0% by weight, and more preferably 10.0 to 30.0% by weight.

Next, the non-crystalline polycarbonate solution is transferred into a solid state polymerization reactor, and according to an intensive solid state polymerization process of conducting the crystallization and solid state polymerization at the same time, a high molecular weight polycarbonate having a weight average molecular weight of 35,000 to 200,000 g/mol is prepared (step (c)).

Figure 2:
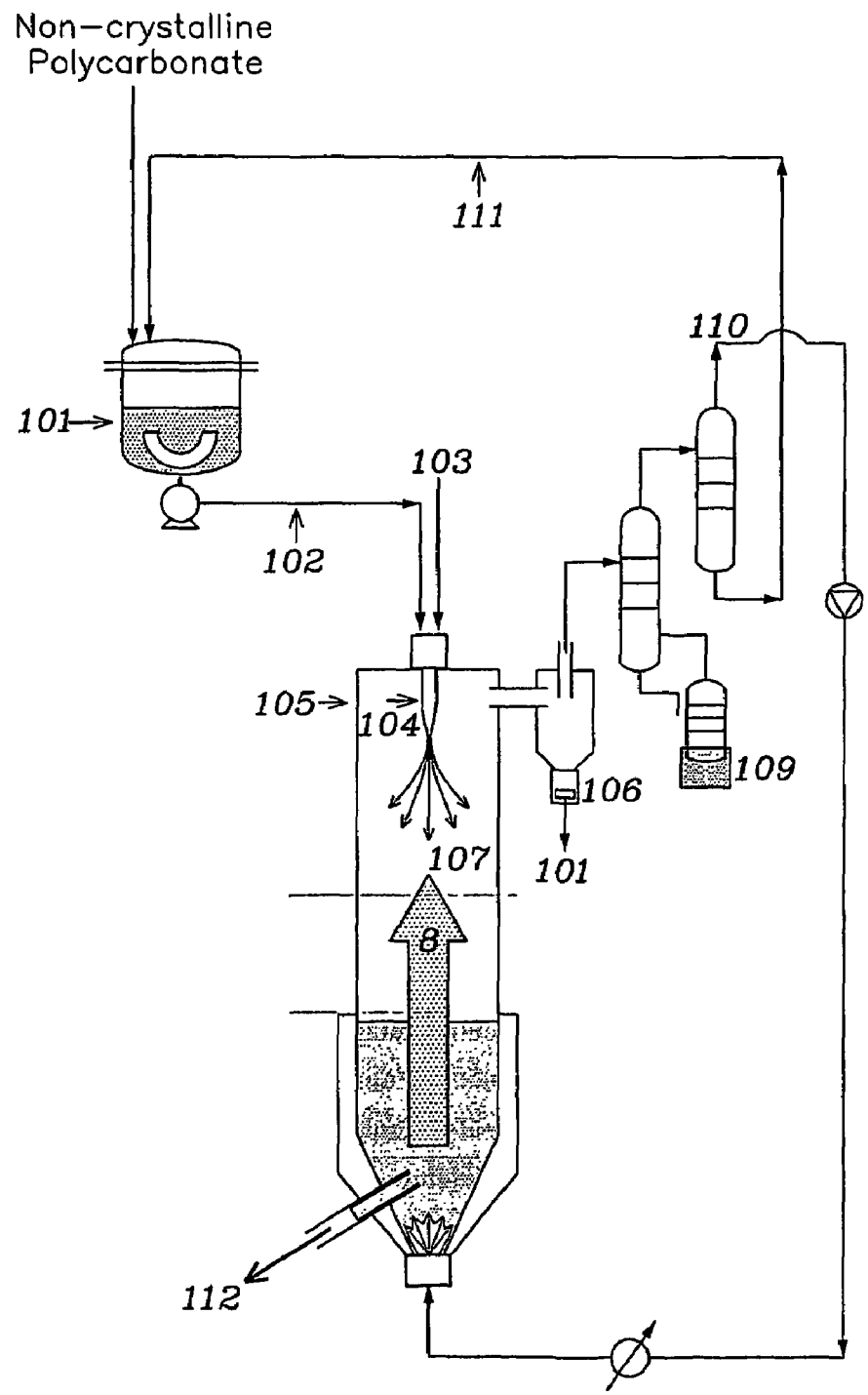
FIG. 2 illustrates an apparatus for the intensive solid state polymerization of polycarbonates.

As shown in FIG. 2, the polycarbonate solution within the dissolution bath (101) is transferred into the upper portion of a solid state polymerization reactor (105), where it is sprayed via a spray nozzle (104) in a spraying and drying part, the solvent is evaporated by high temperature nitrogen flowing in an opposite direction, and the crystalline polycarbonate in the form of particles is collected in the polymerization chamber in the lower portion of the reactor, whereby the solid state polymerization proceeds.

As the form of the nozzle used in the upper portion of the solid state polymerization reactor, a pressure nozzle and a pneumatic nozzle are preferable. To adjust the size and crystallinity of the crystalline polycarbonate particles collected in the polymerization chamber for the solid state polymerization, in the case of the pneumatic nozzle, the flow rate of the compressed nitrogen, the temperature of the drying chamber, and the injection speed of the polycarbonate solution into the nozzle are optimized.

The flow rate of the compressed nitrogen is preferably 200 to 800 l/hour, and more preferably, 300 to 600 l/hour. If the flow rate of the compressed nitrogen is more than 800 l/hour, most crystalline particles that are dried become fine powders having a diameter of less than 80 μm and are collected in a cyclon, and the degree of crystallization becomes less than 5%. Also, if the flow rate of the compressed nitrogen is less than 200 l/hour, the content of the solvent that is not evaporated within the produced crystalline particles is greatly increased.

The pressure nozzle enables controling the size of particles and the degree of crystallization through the control of solution pressure. The temperature of the spraying and drying chamber can be controlled by adjusting the length of the temperature control equipment through which the input high temperature nitrogen passes, and it is preferably 40 to 250° C. and more preferably, 60 to 150° C. If the temperature is out of this temperature range, the evaporation rate of the solvent is not appropriate and thus the degree of crystallization is too low or the content of the solvent becomes high, and accordingly it is difficult to immediately apply it to the solid state polymerization.

The optimal injection speed of the polycarbonate solution into the nozzle varies by the concentration of the solution. Consequently, the size of the crystalline polycarbonate particles that are collected in the polymerization chamber is preferably 80 to 3,000 μm, and the variation of the particle size is preferably within 20%. The polycarbonate particles having a diameter of less than 80 μm not only have a low degree of crystallization, but they are also not suitable for the nitrogen input condition of the polymerization chamber, and accordingly, they are refluxed into the dissolution bath after being collected in the cyclon.

Also, it is preferred that the Poly Dispersity Index of the high molecular weight polycarbonate resin produced in step (c) above is less than 2.5, and its increase rate is within 10% in comparison with the value before the solid state polymerization.

Unlike the conventional processes as described above, in the present invention, the unreacted dialkyl(aryl)carbonate that is fed in a somewhat excessive amount during the initial reaction and that exists after the termination of the reaction, and the reaction byproducts having the degree of polymerization of less than 3, are eliminated before the solid state polymerization. Consequently, the degree of polymerization can be represented by the following formula 3:

$$X_n = \{1+r\} \text{ over } \{1+r-2rp\} \quad \text{[Formula 3]}$$

(wherein $X_n$ is the degree of polymerization, r is a molar ratio of an aromatic hydroxy compound group with regard to a dialkyl(aryl)carbonate group in the non-crystalline polycarbonate solution, and p is the extent of the polymerization reaction.)

If the extent of the reaction, p, has the value of 1.0, the above formula 3 can be represented by the following formula 4, whereby the degree of polymerization can be maximized within a short time by controlling r to a value close to 1.0.

$$X_n = \{1+r\} \text{ over } \{1-r\} \quad \text{[Formula 4]}$$

(wherein $X_n$ is the degree of polymerization, and r is a molar ratio of an aromatic hydroxy compound group with regard to a dialkyl(aryl)carbonate group in the non-crystalline polycarbonate solution.)

In the present invention, the value of r is controlled specifically within the range of the following formula 5 through the melt polycondensation process, and thus the maximum degree of polymerization in the solid state polymerization is achieved within a short time.

$$0.99.1 \leq r \leq 1.000 \quad \text{[Formula 5]}$$

(wherein r is a molar ratio of an aromatic hydroxy compound group with regard to a dialkyl(aryl)carbonate group in the non-crystalline polycarbonate solution.)

For example, the conventiaonl solid state polymerization time required to prepare high molecular weight polycarbonates having a molecular weight of 40,000 is 8 hours or longer, whereas the solid state polymerization time of the present invention is one and a half hours, and accordingly, the invention has an effect of reducing time by more than a factor of five.

The polycarbonate particles that are collected in the polymerization chamber are prepared into a high molecular weight crystalline polycarbonate having a weight average molecular weight of 35,000 to 200,000 g/mol through the solid state polymerization within a short time.

To efficiently eliminate the reaction byproducts, high temperature nitrogen is continuously injected via a distributor at the lower portion of the polymerization chamber. The temperature of the nitrogen is preferably controlled to be equal to the temperature of the polymerization chamber. The temperature of the polymerization chamber is controlled under the isothermal or elevated temperature conditions using a jacket outside the well so as to satisfy the following formula 1, whereby the solid state polymerization proceeds.

$$T_m - 50 \leq T_p \leq T_m \quad \text{[Formula 1]}$$

(wherein $T_p$ is a solid state polymerization temperature, and $T_m$ is the melting temperature of the non-crystalline polycarbonate.)

Also, the present invention provides a high molecular weight polycarbonate resin prepared by a series of the above processes.

The polycarbonate resin prepared by the above method is obtained from the lower portion of the polymerization chamber after a certain residence time according to a desired high molecular weight. The weight average molecular weight of the produced high molecular weight polycarbonate is 35,000 to 200,000 g/mol, and it can be used for injection and extrusion.

The present invention does not require a separate crystallization apparatus as compared with the conventional solid state polymerization processes, and it also has advantages of excluding pulverization (pelletization) and drying process, etc. required for the conventional processes.

In addition, the high molecular weight polycarbonate prepared by the conventional processes has increase rate in the Poly Dispersity Index of 15% to 25% in comparison with before the solid state polymerization, while the high molecular weight polycarbonate prepared by the present invention has the increase rate of merely 5.5% in comparison with the value before the solid state polymerization because the crystallization process in the solid state polymerization reactor is conducted by spray crystallization—it was reduced to ¼ as compared with the conventional processes—and therefore, a high molecular weight polycarbonate resin having a uniform molecular weight and physical properties could be prepared.

The following are the examples and comparative examples of the invention. The following examples and comparative examples are provided solely to describe the invention more clearly; the matter of invention should not be construed to be limited thereto.

EXAMPLE 1

Preparation of Crystalline Polycarbonate

After a non-crystalline polycarbonate having a weight average molecular weight of 8,840 g/mol (Poly Dispersity Index, PDI=1.84) prepared by an ester-exchange reaction of bisphenol A and diphenylcarbonate was dissolved in a 2 l dissolution bath using chloroform as a solvent to prepare a solution of 20 wt.%, the prepared solution was sprayed into the top of a drying chamber while high temperature nitrogen at 120° C. was injected therein at a flow rate of 300 l/hour via a nozzle at the lower portion of the drying chamber, as shown in FIG. 1, to evaporate all solvent and to thereby yield a crystalline polycarbonate in the form of dried particles from the lower portion of the drying chamber.

Both evaporated solvent and high temperature nitrogen in the above procedure passed through the cyclon adhered to the side of the upper portion and were separated into liquid-state solvent and gaseous-state nitrogen via a condenser, and then the solvent was refluxed back into the dissolution bath and nitrogen was refluxed into a heating chamber via a compressor. In the drying chamber, particles having a diameter of less than 80 μm and whose crystallinity was very low (within 10%) could be obtained in a small amount, and all of them were collected in the cyclon in the side of the upper portion and refluxed into the dissolution bath. As a result of analysis of the crystalline polycarbonate obtained from the lower portion of the drying chamber by an electron microscope and an image analyzer, its average diameter was 300±27 μm and the particle size was uniform so that a separate pulverization for solid state polymerization was not required. Also, as a result of determination using a differential scanning calorimeter, the degree of crystallization was 26.5% and the melting point was 221.56° C.

Preparation of High Molecular Weight Crystalline Polycarbonate Resin

The above prepared crystalline polycarbonate was injected into the solid state polymerization reactor without a separate pulverization and drying process, and a solid state polymerization reaction was conducted under the isothermal condition of 200° C. while continuously injecting nitrogen at the speed of 3 l per min. As a result, after reaction for 15 hours, a high molecular weight polycarbonate resin whose weight average molecular weight was 31,751 g/mol and poly dispersity index was 1.94 was yielded.

EXAMPLE 2

Preparation of Crystalline Polycarbonate

A crystalline polycarbonate was prepared using the same method as used in Example 1 except that a non-crystalline polycarbonate used in the crystallization was prepared through ester-exchange reaction and condensation reaction, and the molecular weight was 24,000 g/mol (poly dispersity index, PDI=1.92) and the flow rate of nitrogen to be input from the nozzle was 400 l/hour.

As a result, the average diameter of the produced crystalline polycarbonate particles was 350±31 μm, and the particle size was uniform so that a separate pulverization for solid state polymerization was not required. Also, as a result of determination using a differential scanning calorimeter, the degree of crystallization was 37.5% and the melting point was 225.74° C.

Preparation of High Molecular Weight Crystalline Polycarbonate Resin

A high molecular weight polycarbonate resin whose weight average molecular weight was 101,751 g/mol and poly dispersity index was 2.01 was prepared by the solid state polymerization of the above-prepared crystalline polycarbonate according to the same method as in Example 1.

COMPARATIVE EXAMPLE 1

Preparation of Crystalline Polycarbonate

A non-crystalline polycarbonate having a weight average molecular weight of 6,951 g/mol (poly dispersity index, PDI=1.88) prepared by ester-exchange reaction of bisphenol A and diphenylcarbonate was dissolved in chloroform so that its concentration became 0.1 g/mL, and a powdered crystalline polycarbonate was obtained as a precipitate using methanol as a non-solvent in the amount of 200% of the prepared solution.

The average diameter of the above crystalline polycarbonate was 550 μm, and a large portion of it existed in the form of a lump with a diameter exceeding 10 mm and thus pulverization was necessary for the solid state polymerization. Consequently, the diameter of the pulverized particles was 150±22 μm and the degree of crystallization was 26.1% as determined by a differential scanning calorimeter.

Preparation of High Molecular Weight Crystalline Polycarbonate Resin

A high molecular weight polycarbonate resin whose weight average molecular weight was 30,072 g/mol, poly dispersity index was 2.26, and molecular weight distribution was substantially enlarged was prepared by the solid state polymerization of the above-prepared crystalline polycarbonate according to the same method as in Example 1.

COMPARATIVE EXAMPLE 2

Preparation of Crystalline Polycarbonate

A crystalline polycarbonate was prepared using the same method as used in Comparative Example 1 except that a non-crystalline polycarbonate used in the crystallization was prepared through ester-exchange reaction and condensation polymerization reaction, and the molecular weight was 24,000 g/mol (poly dispersity index, PDI=1.92).

The average diameter of the above crystalline polycarbonate was 590 μm, and a large portion of it existed in the form of a lump with a diameter exceeding 10 mm and thus pulverization was necessary for the solid state polymerization. Consequently, the diameter of the pulverized particles was 200±18 μm, and the degree of crystallization was 21.1% as determined by a differential scanning calorimeter.

Preparation of High Molecular Weight Crystalline Polycarbonate Resin

A high molecular weight polycarbonate resin whose weight average molecular weight was 92,700 g/mol, poly dispersity index was 2.49, and molecular weight distribution was large was prepared by the solid state polymerization of the above-prepared crystalline polycarbonate according to the same method as in Example 1.

From a comparison of the above Example 1 and Comparative Example 1, and Example 2 and Comparative Example 2, it could be seen that as a result of the preparation of crystalline polycarbonates by optimizing the flow rate of the high pressure nitrogen, the temperature of the drying chamber, and the injection speed of the polycarbonate solution into the nozzle through the spray crystallization method of non-crystalline polycarbonates according to the subject invention, the prepared crystalline polycarbonate had a degree of crystallization between 20% and 30%, which is suitable for solid state polymerization. Additionally, unlike the previous results, the size of the particles showed a very narrow distribution within the values of 80 to 3,000 μm with a variation range of less than 10%, because of control of the spray conditions without pulverization.

In addition, as a result of the solid state polymerization in the invention, the drying process and pulverization could be excluded, and consequently substantial processing time and operation costs after the crystallization stage could be saved, and the weight average molecular weight of the produced high molecular weight polycarbonate resin could be raised to a maximum of 101,751 g/mol after solid state reaction for 15 hours.

In addition, the increase rate in the poly dispersity index of the produced high molecular weight polycarbonate resin was merely 5.4% in comparison with the value before the solid state polymerization—it was no more than about ¼ of 20.9% shown in the comparative example according to the previous manner.

Accordingly, it can be seen that the invention can, in advance, prevent the occurrence of low-quality polycarbonates having poor properties, which may be generated by a high poly dispersity index when it is produced on an industrial scale, and it is possible to produce resin products having uniform molecular weights and properties in large quantities in a stable manner.

The following is an example concerning another embodiment of the subject invention, that is, the method for preparing a high molecular weight polycarbonate resin by conducting crystallization and solid state polymerization simultaneously.

EXAMPLE 3

Melt Polycondensation Process—Preparation of Non-crystalline Polycarbonate

After diphenylcarbonate and bisphenol A were mixed in a molar ratio of 1.05:1 and injected into a reactor under a nitrogen atmosphere, they were reacted while stirring with a jacket temperature of 230° C. for 5 min. Then, after an ester-exchange reaction of the reactants under a reduced pressure of 2 mmHg for 30 min., they were transferred into a rotating disc reactor, where the condensation polymerization reaction of the polycarbonate was carried out for 80 min. while continuously injecting nitrogen gas therein, to thereby prepare a middle molecular weight non-crystalline polycarbonate having a weight average molecular weight of 23,600 g/mol.

Intensive Solid State Polymerization Process—Preparation of High Molecular Weight Polycarbonate After the non-crystalline polycarbonate prepared by the above melt polycondensation whose weight average molecular weight was 23,600 g/mol (poly dispersity index, PDI=1.92) was dissolved in a 2 l dissolution bath using chloroform as a solvent to prepare a solution of 20 wt.%, the prepared solution was sprayed into an intensive solid state polymerization reactor along with high temperature nitrogen to be injected at a flow rate of 400 l/hour via a nozzle, as shown in FIG. 2, all solvents were evaporated by contacting them with the nitrogen that was supplied from the lower portion of the polymerization chamber, and then solid polymerization reaction was carried out after collecting crystalline polycarbonate in the form of dried particles in the polymerization chamber.

The high temperature nitrogen at 200° C. that was supplied from the lower portion of the polymerization chamber was cooled to 120° C. with temperature control equipment and then contacted with the solution. All of the high temperature nitrogen and solvent evaporated in the drying chamber passed through a cyclon adhered to the side of the upper portion, and were separated into liquid-state solvent and gaseous-state nitrogen via a condenser, and then the solvent was refluxed again into a dissolution bath and nitrogen was refluxed into a heating chamber via a compressor.

In the drying chamber, particles having a diameter of less than 80 μm, whose crystallinity is very low (within 10%) could be obtained in a small amount, and all of them were collected in the cyclon in the side of the upper portion and refluxed into the dissolution bath. As a result of analysis of the crystalline polycarbonate falling into the polymerization chamber by an electron microscope and an image analyzer, its average diameter was found to be 350±31 μm and the particle size was uniform. Also, as a result of determination using a differential scanning calorimeter, the degree of crystallization was 26.5% and the melting point was 221.56° C.

As a result of analysis of the high molecular weight polycarbonate obtained after the residence time of 15 hours in the polymerization chamber, its weight average molecular weight was found to be 102,800 g/mol and the poly dispersity index was 2.01.

COMPARATIVE EXAMPLE 3

Ester-exchange Reaction—Preparation of Low Molecular Weight Polycarbonate Prepolymer After diphenylcarbonate and bisphenol A were mixed in a molar ratio of 1.05:1 and injected into a reactor under a nitrogen atmosphere, they were reacted while stirring with a jacket temperature of 230° C. for 5 min. Then, a low molecular weight non-crystalline polycarbonate prepolymer having a weight average molecular weight of 8,840 g/mol was prepared by ester-exchange reaction of the reactants under a reduced pressure of 2 mmHg for 30 min.

Crystallization Process—Preparation of Crystalline Polycarbonate

After the low molecular weight non-crystalline polycarbonate prepared by the above process (poly dispersity index, PDI=1.88) was dissolved in chloroform so that so that its concentration became 0.1 g/mL, a powdered crystalline polycarbonate was obtained as a precipitate using methanol in the amount of 200% of the prepared solution as a non-solvent. The average diameter of the above crystalline polycarbonate was 550 µm, and a large portion of it existed in the form of a lump with a diameter exceeding 10 mm, and thus pulverization was necessary for the solid state polymerization. Consequently, the diameter of the pulverized particles was 150±22 µm, and the degree of crystallization was 26.1% as determined by a differential scanning calorimeter.

Solid State Polymerization Process—Preparation of High Molecular Weight Polycarbonate After the above-prepared crystalline polycarbonate was injected into an ordinary cylinder-type solid state reactor, solid state polymerization thereof was carried out under the isothermal condition of 200° C. while continuously injecting nitrogen at the speed of 3 l per min from the upper portion of the reactor. As a result, after reaction for 15 hours, a high molecular weight polycarbonate resin whose weight average molecular weight was 31,751 g/mol, poly dispersity index was 2.26, and molecular weight distribution was significantly enlarged was yielded.

From Example 3 and Comparative Example 3 above, it could be seen that the weight average molecular weight of the high molecular weight crystalline polycarbonate of Example 3 obtained from the melt polycondensation of non-crystalline polycarbonate and the solid state polymerization thereof according to the present invention was 3.2 times higher than that of the high molecular weight crystalline polycarbonate of Comparative Example 3 prepared by the ester-exchange reaction and the solid state polymerization reaction according to the previous process (after solid state polymerization reaction for 15 hours).

In addition, the time required for preparing polycarbonates having the same molecular weight was reduced by ⅓ to ⅕, a high molecular weight polycarbonate resin of more than 100,000 g/mol, which could not be obtained within 15 hours by the previous processes could be prepared within 15 hours, as shown in FIG. 3, and a polycarbonate resin having a weight average molecular weight of 40,000 g/mol could be prepared within 2 hours.

Further, from a comparison of Example 3 using the intensive solid state polymerization process and Comparative Example 3 according to the previous manner using the crystallization process and general solid state polymerization process, it could be seen that the degree of crystallization of the crystalline particles to be polymerized in a solid state manner in the polymerization chamber according to the intensive solid state polymerization process of non-crystalline polycarbonate in the invention was 20% to 30%, which is suitable for solid state polymerization. At the same time, unlike the previous results shown in Comparative Example 3, the size of particles in the invention showed a very narrow distribution within the average diameter of 80 to 3,000 µm, and with a variation range of less than 10% according to the control of spray conditions, without pulverization.

Furthermore, because the invention does not require a drying apparatus and a pulverization apparatus or an additional crystallization apparatus that was necessary for the previous processes, substantial processing time and operation costs could be saved, and the weight average molecular weight of the produced high molecular weight polycarbonate resin could be raised to a maximum of 102,800 g/mol after solid state reaction for 15 hours. The increase rate in the poly dispersity index of the produced high molecular weight polycarbonate resin was merely 4.7% in comparison with the value before the solid state polymerization—it was no more than about ¼ of 20.2% shown in the Comparative Example 3 according to the previous manner.

Accordingly, the invention can, in advance, prevent the occurrence of low-quality polycarbonates having poor properties, which may be generated because of a high poly dispersity index when it is produced on an industrial scale, and it is possible to produce resin products having uniform molecular weight and properties in quantities in a stable manner.

As described above, as the method for the crystallization of a non-crystalline polycarbonate of the present invention enables solid state polymerization without a separate pulverization step, it is possible to produce a high molecular weight polycarbonate resin having a narrow molecular weight distribution and uniform properties that is applicable to injection and extrusion in large quantities with a low cost within a short time.

In addition, according to another embodiment of the present invention, that is, the method for the preparation of a high molecular weight polycarbonate resin by conducting crystallization and solid state polymerization simultaneously, it is possible to efficiently prepare a quantity of the high molecular weight polycarbonate resin within a short time by conducting both crystallization and solid state polymerization of a non-crystalline polycarbonate, which is prepared through melt polycondensation, in a solid state polymerization reactor at the same time without a separate crystallization process, as well as to maximize the increase rate in the molecular weight of the polycarbonate during the solid state polymerization by optimizing the molar ratio between the reactive terminal groups of the non-crystalline polycarbonate by the elimination of unreacted reactants and low molecular weight byproducts during the melt polycondensation stage where ester-exchange reaction and short-time condensation polymerization occur continuously.

The invention claimed is:

1. A method for the preparation of a high molecular weight polycarbonate resin, which comprises the steps of:
   a) preparing a crystalline polycarbonate in the form of particles having an average diameter of 80 to 3,000 µm and a variation for the average particle diameter distribution of less than 20%, which comprises the steps of dissolving an amorphous polycarbonate having a weight average molecular weight of 1,500 to 30,000 g/mol in a solvent;

transferring the polycarbonate solution into a drying chamber and spraying the transferred solution using a nozzle in the drying chamber; and contacting the sprayed solution with a high temperature gas to evaporate the solvent; and b) conducting a solid state polymertizaon of the crystalline polycarbonate prepared in step a) to prepare a high molecular weight polycarbonate resin having a weight average molecular weight of 35,000 to 200,000 g/mol.

2. The method for the preparation of the high molecular weight polycarbonate resin according to claim 1, wherein the b) solid state polymerization is carried out by injecting the crystalline polycarbonate prepared in step a) into a solid state polymerization reactor and then continuously injecting nitrogen thereinto, or by polymerzing it while eliminating the reaction byproducts under a reduced pressure of 0 to 50 mmHg.

3. The method for the preparation of the high molecular weight polycarbonate resin according to claim 1, wherein solid state polymerization temperature in step b) satisfies the following formula 1:

$$T_m - 50 \leq T_p \leq T_m \quad \text{[Formula 1]}$$

wherein $T_p$ is a solid state polymerization temperature, and $T_m$ is the melting temperature of the crystalline polycarbonate.

4. A high molecular weight polycarbonate resin prepared according to the method of claim 1.

5. A method for the preparation of a high molecular weight polycarbonate resin, which comprises the steps of:
(a) conducting a melt polycondensation of a dialkyl(aryl) carbonate and an aromatic hydroxyl compound in the presence of a catalyst to prepare an amorphous polycarbonate having a weight average molecular weight of 1,500 to 30,000 g/mol;
(b) dissolving the amorphous polycarbonate in a solvent to prepare an amorphous polycarbonate solution; and
(c) transferring the amorphous polycarbonate solution into a solid state polymerization reactor, and then conducting an intensive solid state polymerization, wherein crystallization and solid state polymerization are conducted simultaneously, to prepare a high molecular weight polycarbonate resin having a weight average molecular weight of 35,000 to 200,000 g/mol by spraying the amorphous polycarbonate prepard in step a) through a nozzle in an upper portion of the solid state polymerization reactor.

6. The method for the preparation of the high molecular weight polycarbonate resin according to claim 5, wherein in the a) melt polycondensation, an ester-exchange reaction and a condensation reaction occur continuously.

7. The method for the preparation of the high molecular weight polycarbonate resin according to claim 5, wherein in the a) melt polycondensation, the mixing ratio of the dialkyl (aryl)carbonate and the aromat hydroxy compound is 1:1 to 1.1:1.

8. The method for the preparation of the high molecular weight polycarbonate resin according to claim 5, wherein the dialkyl(aryl)carbonate is selected from the group consisting of diphenyl-carbonate, bis-chlorophenyl-carbonate, m-cresyl-carbonate, dinaphthyl-carbonate, dimethyl-carbonate, and dicyclohexyl-carbonate.

9. The method for the preparation of the high molecular weight polycarbonate resin according to claim 5, wherein the aromatic hydroxy compound is selected from the group consisting of bis(4-hydroxy phenyl)-methane, 2,2-bis(4-hydroxyphenyl)-propane, 2,2-bis(4-hydroxy-3,5-dibromophenyl)-propane, 1,4-dihydroxy-3-methyl-benzene, and bis(4-hydroxyphenl)sulfide.

10. The method for the prepartion of the high molecular weight polycarbonate resin according to clam 5, wherein the catalyst is selected from the group consisting of an alkali metal selected from sodium hydroxide, potassium hydroxide, lithium hydroxide, sodium carbonate, potassium carbonate, and lithium carbonate; a nitrogen-based catalyst selected from the group consisting of tetramethylammoniumhydroxide $((CH_3)_4NOH)$, and tetrabutylammoniumhydroxide $((C_4H_9)_4NOH)$; and an acid catalyst selected from the group consisting of boric acid and phosphoric acid.

11. The method for the preparation of the high molecular weight polycarbonate resin according to claim 5, wherein in the a) melt polycondensation, dialkyl(aryl)carbonate that exists in an unreacted state and reaction byproducts of a low degree of polymerization of less than 3 are removed at 180 to 400° C. under reduced pressure of 0 to 50 mmHg, or by injecting nitrogen of 0.1 $Nm^3/kg \cdot h$ or more.

12. The method for the preparation of the high molecular weight polycarbonate resin according to claim 5, wherein the a) melt polycondensation is carried out in a rotating disk reactor, a rotating case reactor, or a thin film reactor.

13. The method for the preparation of the high molecular weight polycarbonate resin according to claim 5, wherein polycarbonate is contained in the amorphous polycarbonate solution of step b) in an amount of 5.0 to 50.0 wt %.

14. The method for the preparation of the high molecular weight polycarbonate resin according to claim 5, wherein in step c), a compressed gas is injected at a speed of 200 to 800 l/hour from the lower portion of the reactor.

15. The method for the preparation of the high molecular weight polycarbonate resin according to claim 5, wherein a temperature in the solid state polymerization reactor of step c) is 40 to 250° C.

16. The method for the preparation of the high molecular weight polycarbonate resin according to claim 5, wherein the nozzle is a pressure nozzle or a pneumatic nozzle.

17. The method for the preparation of the high molecular weight polycarbonate resin according to claim 5, wherein in step c), crystalline polycarbonate that falls into the lower portion of the solid state polymerization reactor has an average diameter of 80 to 3,000 μm, and variation of particle diameter distribution of less than 20%.

18. The method for the preparation of the high molecular weight polycarbonate resin according to claim 5, wherein the high molecular weight polycarbonate resin prepared in step c) has poly dispersity index of less than 2.5 and poly dispersity index increase rate of less than 10% in comparison with the value before the solid state polymerization.

19. The method for the preparation of the high molecular weight polycarbonate resin according to claim 5, wherein the degree of polymerization of the solid state polymerization reaction satisfies the following formula 3:

$$X_n = \{1+r\} \text{ over } \{1+r-2rp\} \quad \text{[Formula 3]}$$

wherein $X_n$ is the degree of polymerization, r is a molar ratio of an aromatic hydroxy compound group with regard to a dialkyl(arylcarbonate group within the noncrystalline polycarbonate solution, and p is the ertent of polymerization reaction.

20. The method for the preparation of the high molecular weight polycarbonate resin according to claim 5, wherein solid state polymerization temperature satisfies the following formula 1:

$$T_m - 50 \leq T_p \leq T_m \quad \text{[Formula 1]}$$

wherein $T_p$ is a solid state polymerization temperate, and $T_m$ is the melting temperature of the non-crystalline polycarbonate.

21. A high molecular weight polycarbonate resin prepared according to the method of claim 5.

* * * * *